United States Patent
Brighton, II et al.

(10) Patent No.: US 8,057,949 B2
(45) Date of Patent: Nov. 15, 2011

(54) FUEL CELL STACK FLOW DIVERSION

(75) Inventors: Fred G. Brighton, II, Ann Arbor, MI (US); Hans Buus Gangwar, Livonia, MI (US); Victor D. Dobrin, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1125 days.

(21) Appl. No.: 11/839,838

(22) Filed: Aug. 16, 2007

(65) Prior Publication Data

US 2009/0044994 A1  Feb. 19, 2009

(51) Int. Cl.
*H01M 8/04* (2006.01)
*B60L 11/18* (2006.01)

(52) U.S. Cl. .................. 429/446; 429/444; 180/65.31

(58) Field of Classification Search .................. None
See application file for complete search history.

(56) References Cited

U.S. PATENT DOCUMENTS

| | | | |
|---|---|---|---|
| 5,724,813 A | 3/1998 | Fenelon et al. | |
| 6,722,128 B1 | 4/2004 | Adrian | |
| 7,043,916 B2 | 5/2006 | Masuda | |
| 7,641,993 B2 * | 1/2010 | Arthur et al. | 429/409 |
| 7,851,099 B2 * | 12/2010 | Ojima et al. | 429/444 |

FOREIGN PATENT DOCUMENTS

| | | |
|---|---|---|
| WO | 2005017329 A1 | 2/2005 |
| WO | 2005047669 A1 | 5/2005 |
| WO | 2005047685 A1 | 5/2005 |

OTHER PUBLICATIONS

Fluid Mechanics and Thermodynamics of Turbomachinery, 4th Edition in SI/Metric Units, S.L. Dixon, B. Eng., Ph.D. 1998.

* cited by examiner

*Primary Examiner* — John S Maples
(74) *Attorney, Agent, or Firm* — Damian Porcari; Brooks Kushman P.C.

(57) ABSTRACT

A fuel cell system has a compressor delivering compressed gas to a fuel cell stack and a control valve affecting the flow of compressed gas. A load dump condition is determined for the fuel cell stack. The flow through the compressor is increased and the additional flow diverted away from the fuel cell stack by the control valve to provide additional load for the fuel cell stack. The fuel cell stack may then be operated at a higher output power for the purpose of generating more waste heat to more rapidly warm itself.

12 Claims, 4 Drawing Sheets

FUEL CELL STACK FLOW DIVERSION

STATEMENT REGARDING FEDERALLY SPONSORED RESEARCH OR DEVELOPMENT

The invention was made with Government support under Contract No. DE-FC36-04G014287. The Government has certain rights to the invention.

BACKGROUND OF THE INVENTION

1. Field of the Invention

The invention relates to the use of compressors and compressed gas in fuel cell systems.

2. Background Art

Fuel cell systems produce electrical energy by combining fuel and an oxidant in a fuel cell stack. In one form of fuel cell system, the fuel is hydrogen and the oxidant is oxygen, which may be mixed with other gases as in air. The oxidant is typically gaseous and is often delivered to the fuel cell stack as a compressed flow.

Typically, fuel cell stacks operate more efficiently under certain operating conditions, including fuel cell stack temperature. In particular, it is desirable for the fuel cell stack to operate at or above a particular temperature, which may be above ambient temperature. Therefore, there is a need to heat the fuel cell stack at various times such as, for example, during startup.

Different types of compressors may be used to provide oxidant to the fuel cell stack. For example, non-positive displacement compressors are sometimes used for a variety of reasons such as size, weight, efficiency, noise, vibration, and harshness characteristics. However, non-positive displacement compressors may operate in an undesirable condition known as surge. Surge occurs when the compressor is operated at low flow rates in combination with a high ratio of output pressure to input pressure. Under these conditions, surge may result in vibrations which can lead to poor operation, malfunction system damage, and the like. In fuel cell systems that use ambient air to provide the oxidant, variations in air density and pressure can affect compressor performance. This is particularly true at higher elevations, where the onset of surge is more likely.

Fuel cell stacks are typically placed in a housing. Unwanted gasses may accumulate in the housing, requiring some mechanisms to vent or purge the unwanted gasses.

Fuel cell systems are often part of a larger system such as, for example, an automotive vehicle. These larger systems often require various environmental modification systems that could benefit from synergistic operation with the fuel cell system.

Accordingly, a need exists for improved fuel cell system operation which addresses some or all of the above issues without unduly affecting cost, complexity, performance, and the like.

SUMMARY OF THE INVENTION

The present invention provides a control valve to affect the flow of compressed gas in a fuel cell system.

In one embodiment, a compressor supplies compressed gas to the fuel cell stack. The compressor may be used as a load dump for energy produced by the fuel cell stack. In this case, the compressor generates an excess flow of compressed gas which is diverted by a control valve away from the fuel cell stack. In one application, excess work done by the fuel cell stack to power the compressor generates heat which warms the fuel cell stack.

Control logic may be used to manage the compressor and the control valve so as to maintain efficient fuel cell stack operating conditions. This control logic may receive as input one or more conditions of the compressed gas, ambient air, compressor, fuel cell stack, control valve, and the like.

The control valve may be used to avoid a surge condition in the compressor. The compressor may generate an increased flow to avoid surge. The control valve may then divert the increased flow away from the fuel cell stack.

According to an embodiment of the present invention, componentry incorporated for expending electrical energy from the fuel cell stack may be reduced or eliminated by running the compressor at a level above that needed to supply compressed gas to the fuel cell stack and diverting excess flow away from the fuel cell stack.

Another embodiment involves utilizing compressed gas diverted away from the fuel cell stack. This diverted gas may be used to modify the environmental conditions of a wide variety of systems such as, for example, a passenger compartment, a radiator, and the like. The diverted gas may also be used to evacuate gases from the fuel cell stack housing or enclosure.

In another embodiment, the fuel cell system may be utilized in an automotive vehicle.

Other aspects, features, and uses of the disclosed inventions will become apparent to one skilled in the art from a study of the following description and associated drawings.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Figure 1:
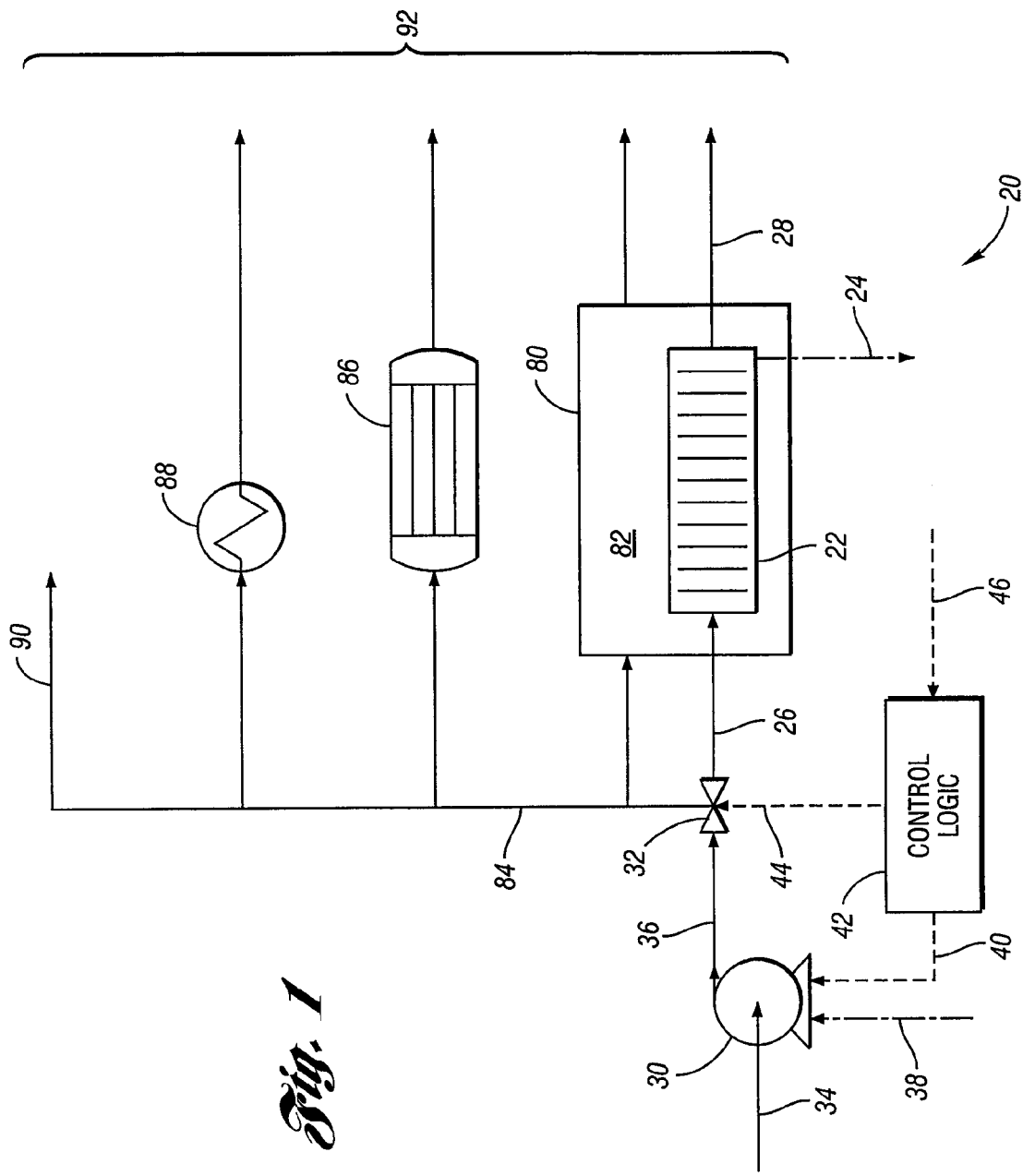
FIG. 1 is a schematic diagram illustrating a fuel cell system according to an embodiment of the present invention.

Referring now to FIG. 1, a schematic diagram illustrating a fuel cell system according to an embodiment of the present invention is shown. A simplified oxidant path of a fuel cell system, shown generally by 20, includes fuel cell stack 22. Fuel cell stack 22 generates electrical energy, shown as 24, by combining ionized fuel and oxidant. The oxidant is provided by fuel cell stack inlet 26. Unused oxidant, and other gases in some systems, exits the fuel cell stack at outlet 28. A wide variety of fuel cell types are available based on different fuels and oxidants, cell stack configuration, desired power output, fuel cell application, and the like. As will be recognized by one of ordinary skill in the art, the present invention does not depend upon the type or construction of the fuel cell stack used.

Fuel cell system 20 also includes compressor 30 and control valve 32. Compressor 30 receives gas at compressor inlet 34 and produces compressed gas at compressor outlet 36. Compressor 30 runs on electrical energy, shown by 38, which is at least a portion of fuel cell stack generated electrical energy 24. The operation of compressor 30 is controlled by compressor control signal 40 provided by control logic 42. Compressor control signal 40 may be one or more of analog voltage signals, analog current signals, pulse width modulated signals, digital signals, and the like. Compressor electrical supply may be AC or DC and may be controlled by control logic 40 so as to provide compressor control signal 40. A wide variety of compressors are available for use in the present invention depending upon the type of oxidant used; flow parameters including pressure, temperature, and velocity; amount of compression needed; fuel cell system application; and the like. In one embodiment, compressor 30 is a centrifugal compressor. As will be recognized by one of ordinary skill in the art, a wide variety of compressor types and configurations may be used in the present invention.

Control valve 32 is disposed in the flow path between compressor outlet 36 and fuel cell stack inlet 26. Control valve 32 diverts flow from compressor 30 away from fuel cell stack 22. Control valve 32 is controlled by valve control signal 44 from control logic 42. Control signal 44 may be any type of analog or digital signal depending upon the type of control valve 32 chosen, including electrical, magnetic, pneumatic, hydraulic, optical, and the like. In addition, any suitable type of control valve 32 may be used. While a single control valve is illustrated, the term control valve includes one or more control valves controlled by one or more valve control signals. As will be recognized by one of ordinary skill in the art, a wide variety of control valve types and configurations may be used to implement the present invention. Moreover, various other components may be disposed in the flow path, including intercooler, filters, water injectors, humidifiers, and the like.

Control logic 42 generates compressor control signal 38 and valve control signal 44 based on one or more control inputs 46, the specific connections of which are not shown for clarity. Control inputs may include flow parameters including mass flow rate, volume flow rate, velocity, temperature, and the like, at various locations in fuel cell system 20 such as compressor inlet 34, compressor outlet 36, fuel cell stack inlet 26, fuel cell stack outlet 26, ambient, and the like. Control logic 42 may also monitor various components in fuel cell system 20 including fuel cell stack 22, compressor 30, control valve 32, and the like. Control inputs 46 may include inputs from a user or another controller. In one embodiment, control logic 46 measures a temperature related to the operation of fuel cell stack 22 and uses compressor 30 as an electrical load for warming fuel cell stack 22. Control logic 42 may be implemented as a computer executing software, as programmable logic, as discrete logic components, as electromechanical, hydraulic, or pneumatic systems, any combination of these, and the like. Control logic 42 may be a single unit or may be distributed between or amongst various units. As will be recognized by one of ordinary skill in the art, the present invention may be implemented in a wide variety of control logic types and configurations.

Figure 2:
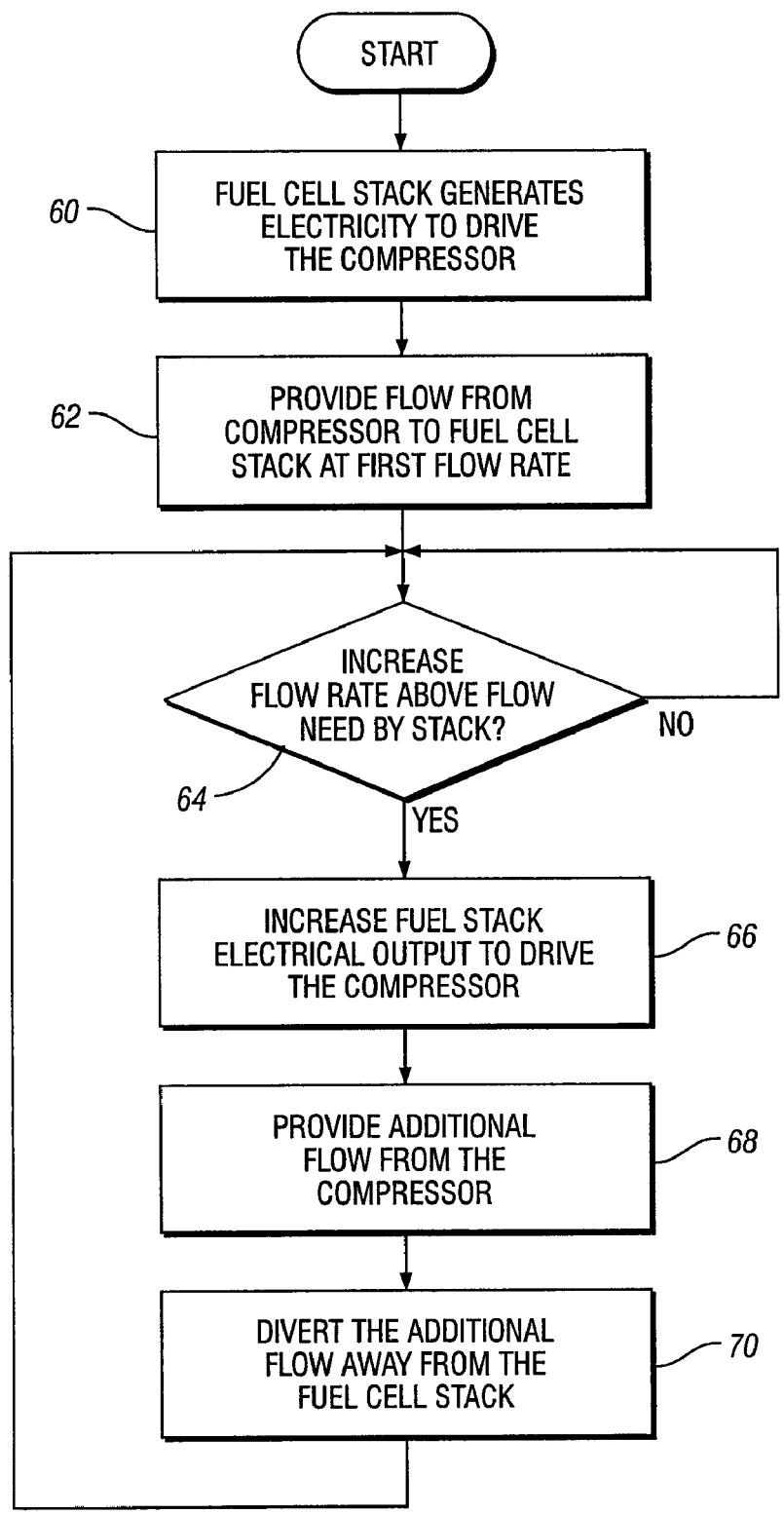
FIG. 2 is a flow diagram illustrating operation of a fuel cell system according to an embodiment of the present invention.

Referring now to FIG. 2, a flow diagram illustrating operation of a fuel cell system according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

The fuel cell stack generates electricity to drive the compressor, as in block 60. The compressor provides a flow of compressed gas to the fuel cell stack at a first flow rate, as in block 62. This flow rate may be determined by one or more of a variety of techniques, including directly or indirectly measuring the mass flow rate, the volumetric flow rate, and the like.

A check is made to determine whether or not to increase the flow rate above the flow needed by the fuel cell stack, as in block 64. This increase may be triggered, for example, by the need to increase the load on the fuel cell stack. One purpose for increasing the load may be to generate heat for warming the fuel cell stack. Another purpose for increasing the load may be to test the fuel cell stack and/or some other component of the fuel cell system. In addition, or rather than, responding to a need to increase fuel cell stack load, the flow rate may be increased so as to generate excess flow for purposes other than to provide oxidant to the fuel cell stack. This excess flow may be used to modify an environmental condition of an element within or outside of the fuel cell system.

If flow is to be increased, the fuel stack electrical output is increased to drive the compressor, as in block 66. Additional flow is provided from the compressor, as in block 68. The additional flow is diverted away from the fuel cell stack, as in block 70. The diverted flow may be directly or indirectly returned to the compressor or vented to the atmosphere. The diverted flow may also be used for a variety of purposes, as disclosed elsewhere herein.

Returning again to FIG. 1, various embodiments for use of diverted flow according to the present invention are shown. Fuel cell stack 22 is contained in housing 80. Operation of fuel cell stack may cause the formation of gases within housing 80, shown generally by 82. Diverted flow 84 from control valve 32 may be routed into housing 80 to purge housing gases 82 from housing 80.

Diverted flow 84 may also be routed to radiator 86, heat exchanger 88, direct application 90, and the like for modifying one or more environmental parameters. Radiator 86 may use diverted flow 84 to heat or cool a liquid such as, for example, coolant used to regulate the temperature of an internal combustion engine or an electronic circuit. Radiator 86 may also function as a heat sink for electrical componentry cooled by diverted flow 84. Heat exchanger 88 may provide heat from diverted flow 84 to a surrounding environment such as, for example, a passenger compartment (not shown for clarity). Direct application 90 provides diverted flow 84 directly into an environment to be modified. The path of diverted flow 84 may include various other components such as diffusers, expanders, intercoolers, humidifiers, and the like for regulating properties of diverted flow 84 prior to use by radiator 86, heat exchanger 88, or direct application 90.

Output flow, shown generally by 92, can include one or more of the flow from fuel stack outlet 28 and the diverted flow 84 uses such as purging housing 80, radiator 86, heat exchanger 88, direct application 90, and the like. Some or all of output flow 92 may be returned to compressor inlet 34, may be vented to ambient, may be routed for other uses, and the like.

Figure 3:
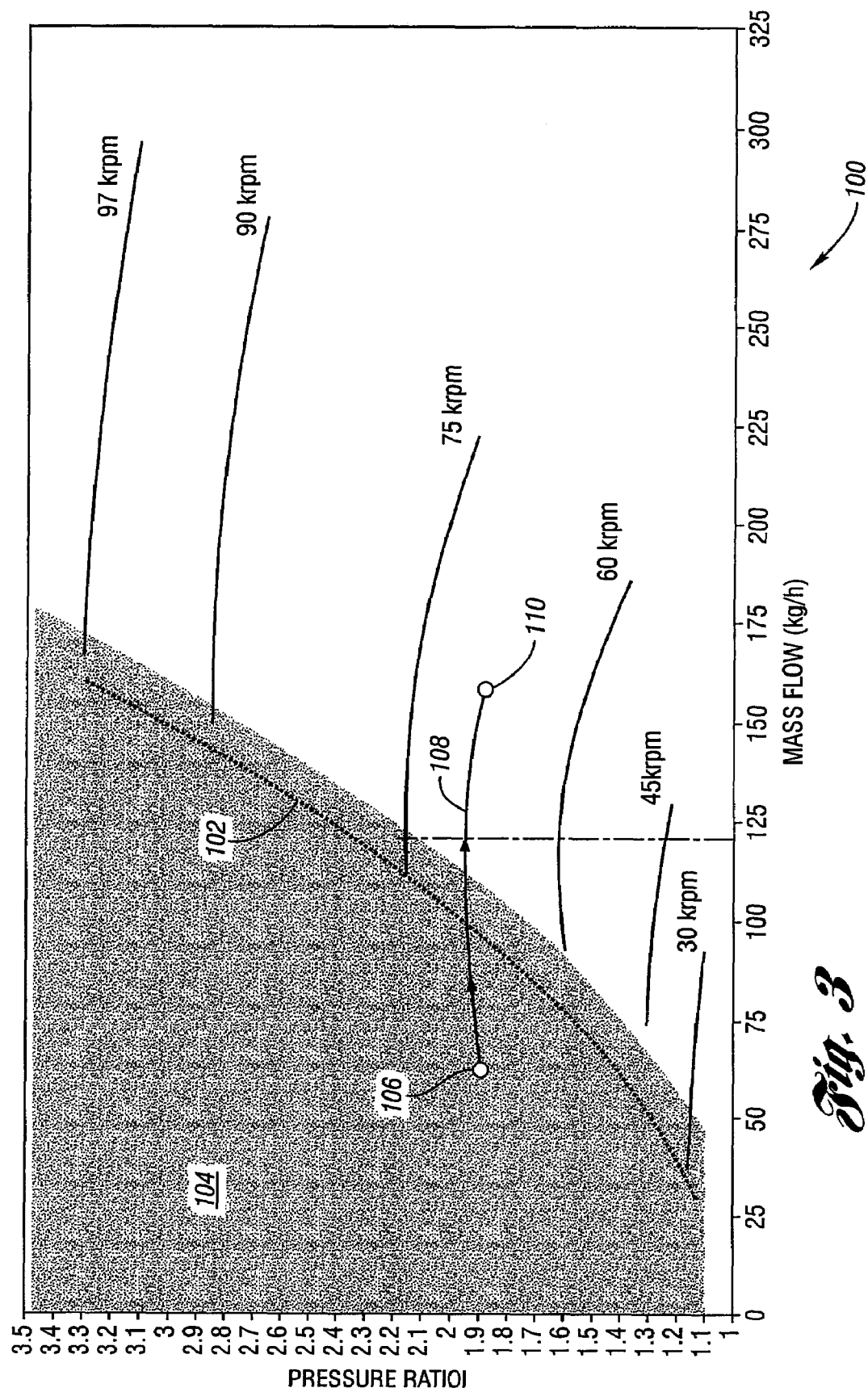
FIG. 3 is a graph illustrating surge avoidance according to an embodiment of the present invention.

Referring now to FIG. 3, a graph illustrating surge avoidance according to an embodiment of the present invention is shown. A compressor operating map, shown generally by 100, plots mass flow rate through an exemplary compressor as a function of compressor pressure ratio. The compressor pressure ratio refers to the ratio of air pressure exiting the exemplary compressor outlet to air pressure entering the exemplary compressor inlet.

Compressor pressure ratio, being a function of mass flow, is also dependent upon the velocity with which the compressor rotates its impellers. Six exemplary compressor operating lines with corresponding angular velocities, indicated on compressor operating map 100, are marked by respective 30, 45, 60, 75, 90, and 97 thousands of revolutions per minute (krpm). Compressor operating maps, such as 100, are typically created by setting a compressor at a constant angular velocity and subsequently varying mass flow through the compressor.

Compressor surge typically occurs when a compressor operates at low flow rates in combination with relatively high compressor pressure ratios. For the example provided, operating the compressor to the left of surge line 102 will more than likely result in compressor 30 experiencing surge. This surge condition may cause unsteady aerodynamic loading, observed in flow and pressure oscillation, which may result in damage to equipment or otherwise affect operation.

The present invention may be used to avoid a surge condition in the compressor. For example, various components in the fuel cell system may be monitored, such as the compressor inlet and compressor outlet. Preexisting compressor performance data may be stored such as, for example, that shown on compressor operating map 100. Surge line 102 represents the pressure at which surge can be expected to occur for a given mass flow rate. When the compressor operates in an intervention region, shown generally by shaded region 104, the compressor may be controlled to increase output flow, thereby avoiding or removing surge. As previously described, this increased flow may be diverted from the fuel cell stack. For example, if the compressor is operating at surge condition 106, mass flow can be increased through the compressor. As flow is increased, operation moves along operating line 108 until stable flow and pressure condition 110 is reached beyond surge line 102.

Control of flow rate may also prevent the compressor from initially reaching surge. For this reason, intervention region 104 may encompass surge line 102 and overlap a portion of conditions in which compressor 30 may be operating satisfactorily. For example, if the compressor is operating at 75 krpm and its mass flow rate drops to 120 kg/h, the compressor flow may be increased before the compressor ever reaches a surge condition.

Figure 4:
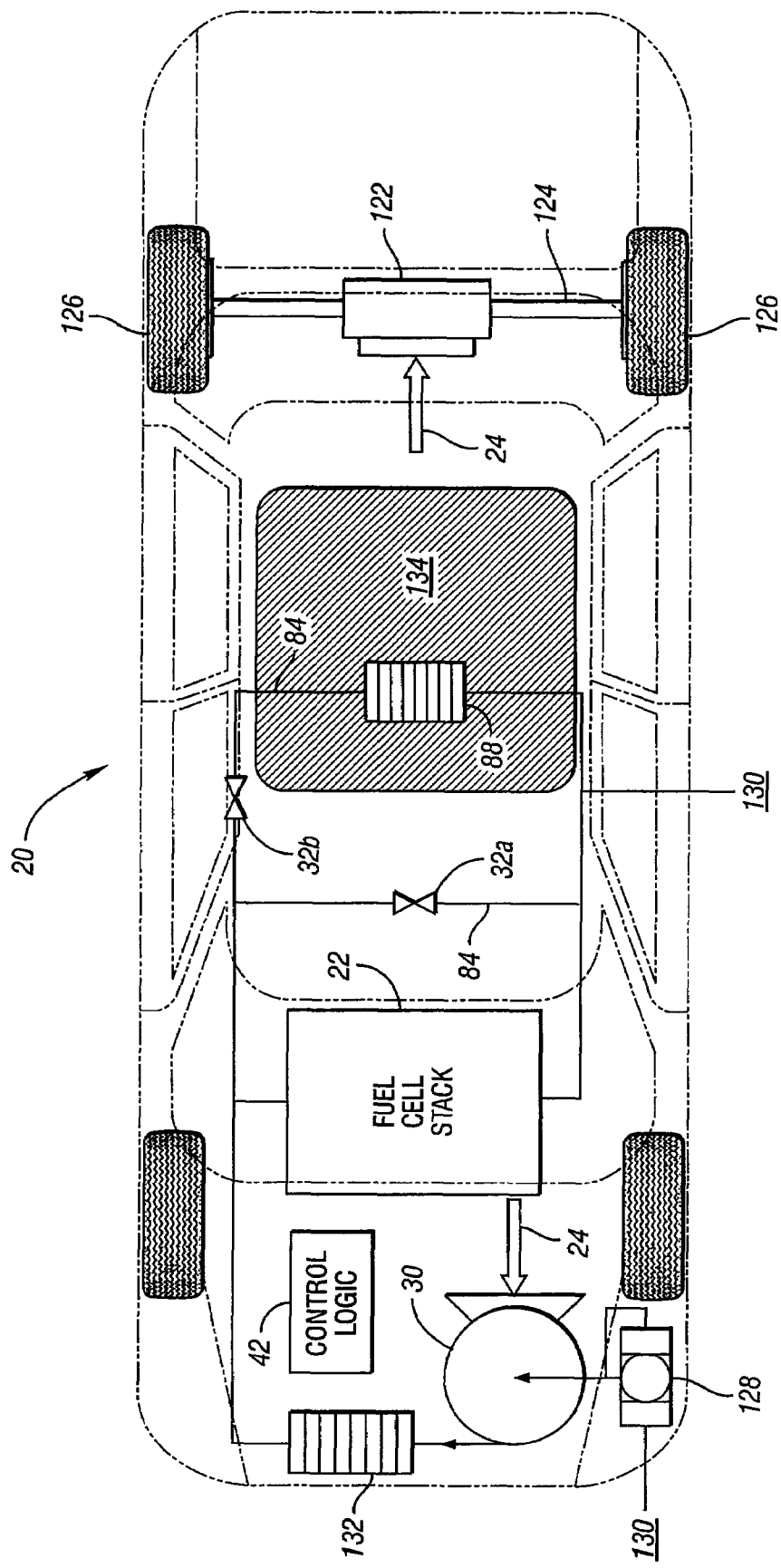
FIG. 4 is a schematic diagram illustrating an automotive vehicle according to an embodiment of the present invention.

Referring now to FIG. 4, a schematic diagram illustrating an automotive vehicle utilizing a fuel cell system according to an embodiment of the present invention is shown. An automotive vehicle, shown generally by 120, is driven by electric motor 122 receiving fuel cell stack generated electrical energy 24. Electric motor 122 may drive axle 124 extending between wheels 126. While electric motor 122 is shown to propel vehicle body 120, one skilled in the art will realize that there are countless alternative applications onboard a motor vehicle which involve an electric motor driving a component. These applications may include operating, for example, power windows, an automatic vehicle closure, power steering, or a plow attached to a vehicle body.

Air filter 128 may be included to purify ambient air 130 prior to its use in fuel cell system 20. Compressor 30, also driven by fuel cell stack generated electrical energy 24, compresses ambient air 130. Air exiting compressor 30 may have an excessive temperature unsuitable for further usage. Air intercooler 132 may be included to modify the temperature of air flow exiting compressor 30 back within a usable range.

In the embodiment shown in FIG. 4, fuel cell system 20 includes control valves 32a and 32b. Control logic 42 operates control valves 32a and 32b for a variety of purposes, such as to provide fuel cell stack 22 with substantially constant absolute pressure compressed air flow for particular operating conditions.

In one application, fuel cell stack 22 is operated at a higher output power solely for the purpose of generating more waste heat to warm itself and any system coolant volume faster. A portion of the output power of fuel cell stack is dumped into compressor 30 for operation at a higher speed. For example, a 50% efficient fuel cell stack generates 1 kW of heat for every 1 kW of output power.

Vehicle 120 includes passenger compartment 134. Passenger compartment 134 may utilize diverted flow 84 passing through heat exchanger 88 to change an environmental condition of passenger compartment 134. Alternatively, heat exchanger 88 may use air flow prior to, or instead of, passing through air intercooler 132.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell system comprising:
a fuel cell stack generating electrical energy;
a compressor providing compressed gas to the fuel cell stack, the compressor driven by the electrical energy generated by the fuel cell stack;
a control valve disposed between the compressor and the fuel cell stack, the control valve diverting at least a portion of the compressed gas produced by the compressor before the compressed gas reaches the fuel cell stack; and
control logic in communication with the compressor and the control valve, the control logic operative to determine a load dump condition for the fuel cell stack, to increase flow through the compressor in response to determining the load dump condition to increase power consumption by the compressor to increase the electrical load on the fuel cell stack to cause the fuel cell stack to generate an increased amount of heat, and to control the control valve to divert at least some of the increased flow away from the fuel cell stack.

2. The system of claim 1 wherein the control logic is further operative to determine when a surge condition exists in the compressor, to increase flow through the compressor to avoid compressor surge, and to control the control valve to divert the increased flow away from the fuel cell stack.

3. The system of claim 1, further comprising a passenger compartment wherein the control logic is further operative to route compressed gas to change an environmental condition of the passenger compartment.

4. The system of claim 1, further comprising a radiator wherein the control logic is further operative to route compressed gas to change a temperature of the radiator.

5. The system of claim 1, wherein the compressed gas reaching the fuel cell stack has a substantially constant absolute pressure.

6. The system of claim 1, wherein the control logic monitors at least one property of the compressed gas and regulates the control valve based on the monitored property.

7. An automotive vehicle system comprising:
- an electrical motor for propelling the vehicle;
- a fuel cell stack generating electrical energy, the electrical motor being driven by electrical energy generated from the fuel cell stack;
- a compressor providing compressed gas to the fuel cell stack, the compressor driven by electrical energy generated by the fuel cell stack;
- a control valve in a flow path for the compressor and the fuel cell stack, the control valve diverting at least a portion of the compressed gas produced by the compressor; and
- control logic operative to determine a load dump condition for the fuel cell stack, to increase flow through the compressor in response to determining the load dump condition to increase power consumption by the compressor to increase the electrical load on the fuel cell stack to cause the fuel cell stack to generate an increased amount of heat, and to control the control valve to divert at least some of the increased flow away from the fuel cell stack.

8. The system of claim 7 wherein the control logic is further operative to determine when a surge condition exists in the compressor, to increase flow through the compressor to avoid compressor surge, and to control the control valve to divert the increased flow away from the fuel cell stack.

9. The system of claim 7, further comprising a passenger compartment wherein the control logic is further operative to route compressed gas to change an environmental condition of the passenger compartment.

10. The system of claim 7, wherein the control valve diverts at least a portion of the compressed gas from an inlet path of the fuel cell stack to an outlet path of the fuel cell stack.

11. The system of claim 7, wherein the compressed gas reaching the fuel cell stack has a substantially constant absolute pressure.

12. The system of claim 7, wherein the control logic monitors at least one property of the compressed gas and regulates the control valve based on the monitored property.

* * * * *